US009516689B2

(12) United States Patent
Kiss

(10) Patent No.: US 9,516,689 B2
(45) Date of Patent: Dec. 6, 2016

(54) MITIGATING NO-SERVICE DELAYS FOR LTE CAPABLE WIRELESS DEVICES WITHOUT LTE ACCESS PERMISSION

(71) Applicant: Apple Inc., Cupertino, CA (US)

(72) Inventor: Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/627,138

(22) Filed: Feb. 20, 2015

(65) Prior Publication Data

US 2015/0245256 A1 Aug. 27, 2015

Related U.S. Application Data

(60) Provisional application No. 61/942,691, filed on Feb. 21, 2014.

(51) Int. Cl.
*H04W 12/00* (2009.01)
*H04W 76/02* (2009.01)
*H04W 48/04* (2009.01)
*H04W 12/06* (2009.01)
*H04W 8/06* (2009.01)
*H04W 8/18* (2009.01)
*H04W 8/22* (2009.01)

(52) U.S. Cl.
CPC ........... *H04W 76/027* (2013.01); *H04W 48/04* (2013.01); *H04W 8/06* (2013.01); *H04W 8/18* (2013.01); *H04W 8/22* (2013.01); *H04W 12/06* (2013.01)

(58) Field of Classification Search
None
See application file for complete search history.

(56) References Cited

U.S. PATENT DOCUMENTS

| 8,565,764 | B2 | 10/2013 | Pudney et al. | |
|---|---|---|---|---|
| 8,571,550 | B2 | 10/2013 | Horn et al. | |
| 2010/0075670 | A1* | 3/2010 | Wu | H04J 11/0093 455/434 |
| 2010/0120432 | A1* | 5/2010 | Watfa | H04W 76/027 455/436 |
| 2010/0172301 | A1* | 7/2010 | Watfa | H04W 36/0022 370/328 |
| 2010/0174776 | A1* | 7/2010 | Westberg | H04L 12/2801 709/203 |
| 2011/0028120 | A1* | 2/2011 | Wu | H04W 36/0022 455/404.1 |

FOREIGN PATENT DOCUMENTS

WO 2014112609 7/2014

* cited by examiner

*Primary Examiner* — Diane Mizrahi
(74) *Attorney, Agent, or Firm* — Meyertons Hood Kivlin Kowert & Goetzel, P.C.; Jeffrey C. Hood; Joel L. Stevens

(57) ABSTRACT

This disclosure relates to reducing or mitigating no-service delays for LTE capable wireless devices which do not have permission to access one or more LTE networks. According to some embodiments, a MME of a first PLMN may receive an LTE NAS request corresponding to a tracking area from a wireless device. The MME may determine to reject the request, and may send a rejection response to the request indicating that access to the first PLMN in the tracking area according to LTE is not available to the wireless device. The rejection response may further include extended cause information relating to whether or not the wireless device is permitted to access the first PLMN in other tracking areas according to LTE.

20 Claims, 9 Drawing Sheets

| 8 | 7 | 6 | 5 | 4 | 3 | 2 | 1 | |
|---|---|---|---|---|---|---|---|---|
| Additional EMM cause IEI | | | | 0 Spare | 0 Spare | Additional EMM Cause | | Octet 1 |

MITIGATING NO-SERVICE DELAYS FOR LTE CAPABLE WIRELESS DEVICES WITHOUT LTE ACCESS PERMISSION

PRIORITY CLAIM

The present application claims benefit of priority to U.S. Provisional Application No. 61/942,691 titled "Mitigating no-service delays for LTE capable wireless devices without LTE access permission" and filed on Feb. 21, 2014, which is hereby incorporated by reference in its entirety as though fully and completely set forth herein.

FIELD

The present application relates to wireless devices, and more particularly to an apparatus, system, and method for reducing the frequency and/or severity of no-service delays for LTE capable wireless devices which do not have LTE access permission.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1 xRTT, 1xEV-DO, HRPD, eHRPD), IEEE 802.11 (WLAN or Wi-Fi), IEEE 802.16 (WiMAX), Bluetooth, and others.

In order to provide a range of possible services or for any of various other reasons, cellular service providers may provide subscription options and/or negotiate roaming agreements which limit or do not include permission to access all possible network elements with which a wireless device is technically capable of accessing. In at least some scenarios, this may result in service delays, periods of no service, or other problems at times when such a device attempts to access, and is rejected by, a type of service which it is not permitted to access.

SUMMARY

Embodiments are presented herein of apparatuses, systems, and methods for reducing the frequency and/or severity of no-service delays experienced by LTE capable wireless devices which do not have LTE access permission, and of devices configured to implement the methods.

An LTE capable wireless device may attempt to obtain LTE (e.g., evolved UMTS Radio Access Network (E-UTRAN)) access to a public land mobile network (PLMN) by sending a non-access stratum (NAS) request, such as an attach request, a combined attach request, a tracking area update, or a combined tracking area update, to a mobility management entity (MME) of the PLMN.

Based on such a request, the MME may determine whether or not the wireless device is permitted LTE access to the PLMN in that particular area. For example, the MME may attempt to authenticate the wireless device to determine whether it has permission to use the LTE network of the PLMN. If the wireless device does not have permission, for example because their subscriber agreement does not include LTE access to that particular PLMN, the MME may reject the NAS request.

In some instances, a wireless device may not have LTE access permission to a PLMN in a particular tracking area, but not generally be forbidden from LTE access to the PLMN. In other instances, a wireless device may not have LTE access permission to a PLMN in multiple areas or possibly at all (e.g., in any tracking area), for example such that LTE access to the PLMN is generally forbidden to the wireless device.

In the latter instances, it may be helpful to provide an indication relating to the wireless device's LTE access permission to the PLMN in other areas than the current location (e.g., tracking area) when rejecting the request, for example in order to prevent the wireless device from attempting to obtain LTE access to the PLMN in other areas (e.g., in which such attempts may be bound to fail).

Thus in some embodiments, according to the techniques presented herein, when providing a rejection to a NAS request for LTE access to a PLMN in a particular area from a wireless device, a MME of the PLMN may provide additional information relating to whether or not the wireless device is permitted LTE access to the PLMN in areas other than the current area of the wireless device.

The additional information may include an indication that LTE access to the PLMN is generally forbidden to the wireless device, or an indication that LTE access to the PLMN is forbidden to the wireless device in certain areas (e.g., tracking areas) without explicitly forbidding the wireless device from LTE access to the PLMN altogether, among various possibilities.

The techniques described herein may be implemented in and/or used with a number of different types of devices, including but not limited to MMEs and other cellular core network entities, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
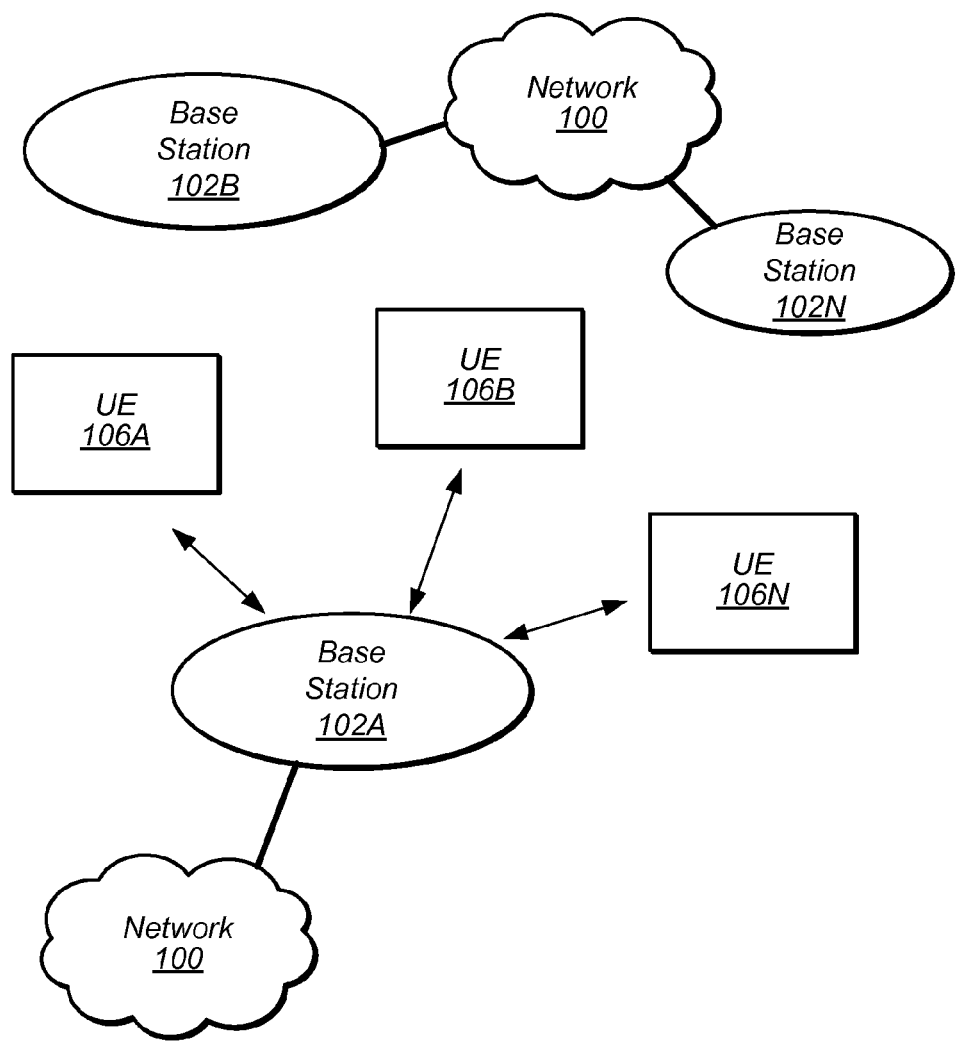
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

INCORPORATION BY REFERENCE

3GPP TS 23.401 version 12.7.0 Release 12, titled "General Packet Radio Service (GPRS) enhancements for Evolved Universal Terrestrial Radio Access Network (E-UTRAN) access", dated December 2014, is hereby incorporated by reference in its entirety as though fully and completely set forth herein.

3GPP TS 24.301 version 12.7.0 Release 12, titled "Non-Access-Stratum (NAS) protocol for Evolved Packet System (EPS); Stage 3", dated December 2014, is hereby incorporated by reference in its entirety as though fully and completely set forth herein.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
LTE: Long Term Evolution
E-UTRAN: Evolved UMTS Radio Access Network or Evolved Universal Radio Access Network
EPC: Evolved Packet Core
EPS: Evolved Packet Service
MME: Mobility Management Entity
EMM: EPS Mobility Management
HSS: Home Subscriber Server
TA: Tracking Area
TAU: TA Update
TAI: TA Identifier
IE: Information Element
AS: Access Stratum
NAS: Non-Access Stratum
PLMN: Public Land Mobile Network
EPLMN: Equivalent PLMN
HPLMN: Home PLMN
VPLMN: Visited PLMN Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices, laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
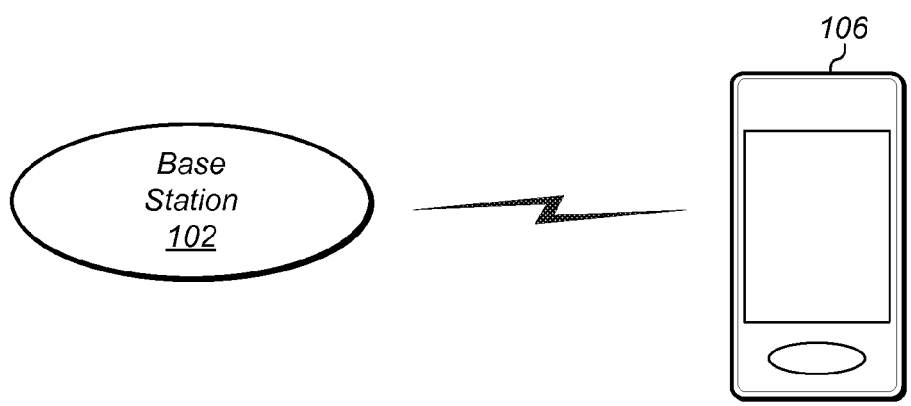
FIG. 2 illustrates a base station (BS) in communication with a user equipment (UE) device, according to some embodiments.
Figure 3:
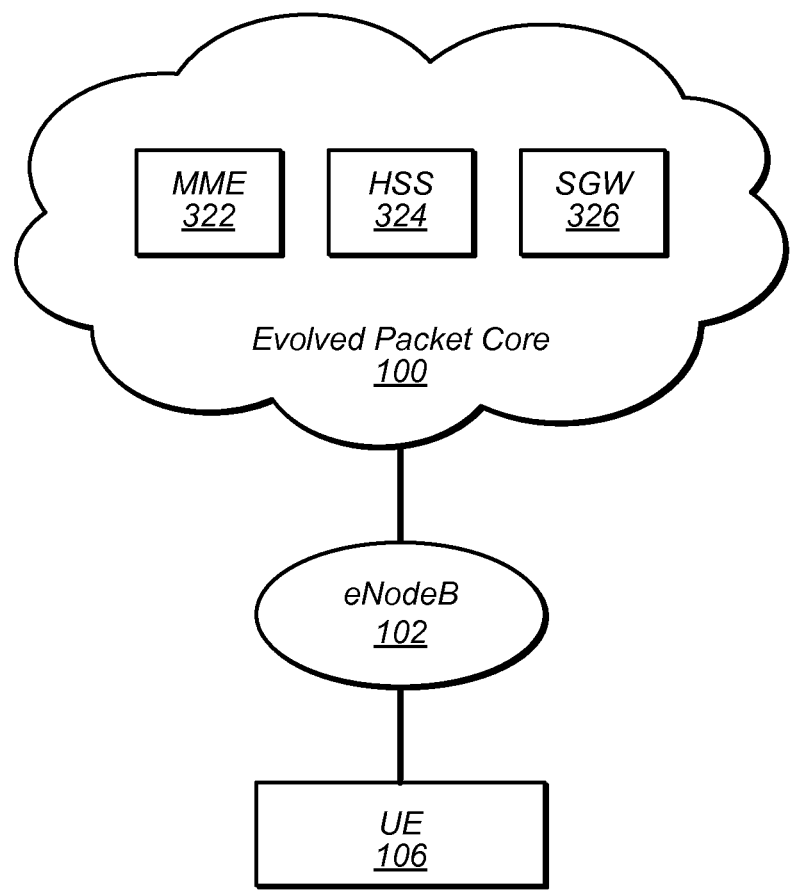
FIG. 3 illustrates an exemplary (and simplified) cellular network architecture, according to some embodiments.

FIGS. 1-3—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1xRTT, 1xEV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

FIG. 3 illustrates an exemplary, simplified portion of a wireless communication system, such as a 3GPP compliant cellular network.

As shown, a UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices and/or entities known to those skilled in the art as well.

Figure 4:
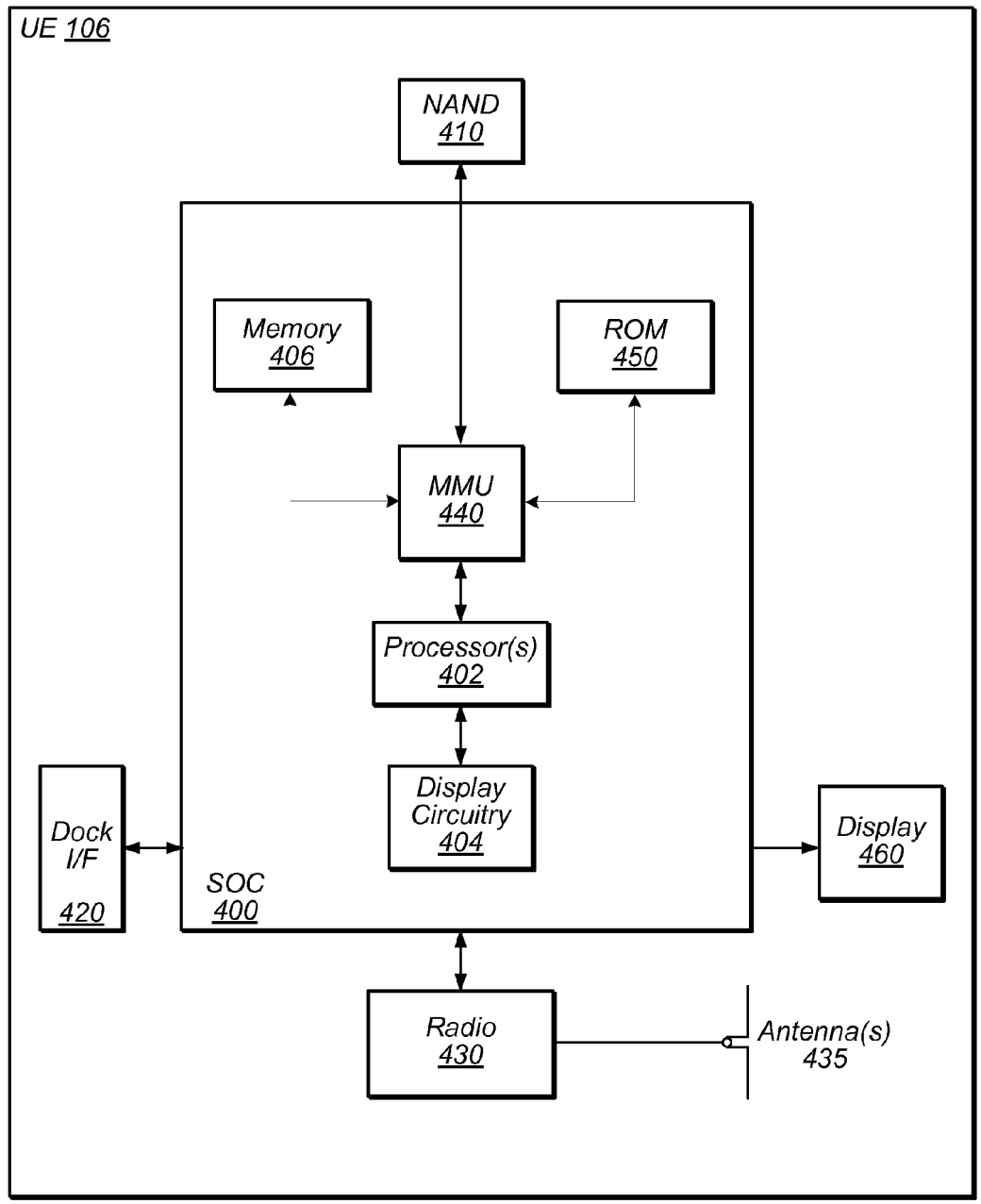
FIG. 4 illustrates an exemplary block diagram of a UE, according to some embodiments.

FIG. 4—Exemplary Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430 (also referred to as a "radio"), connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, WiFi, etc.).

As noted above, the UE 106 may be configured to communicate wirelessly using multiple wireless communication technologies. As further noted above, in such instances, the wireless communication circuitry (radio(s)) 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 435 to perform the wireless communication.

As described further subsequently herein, the UE 106 may include hardware and software components for implementing part or all of the methods described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
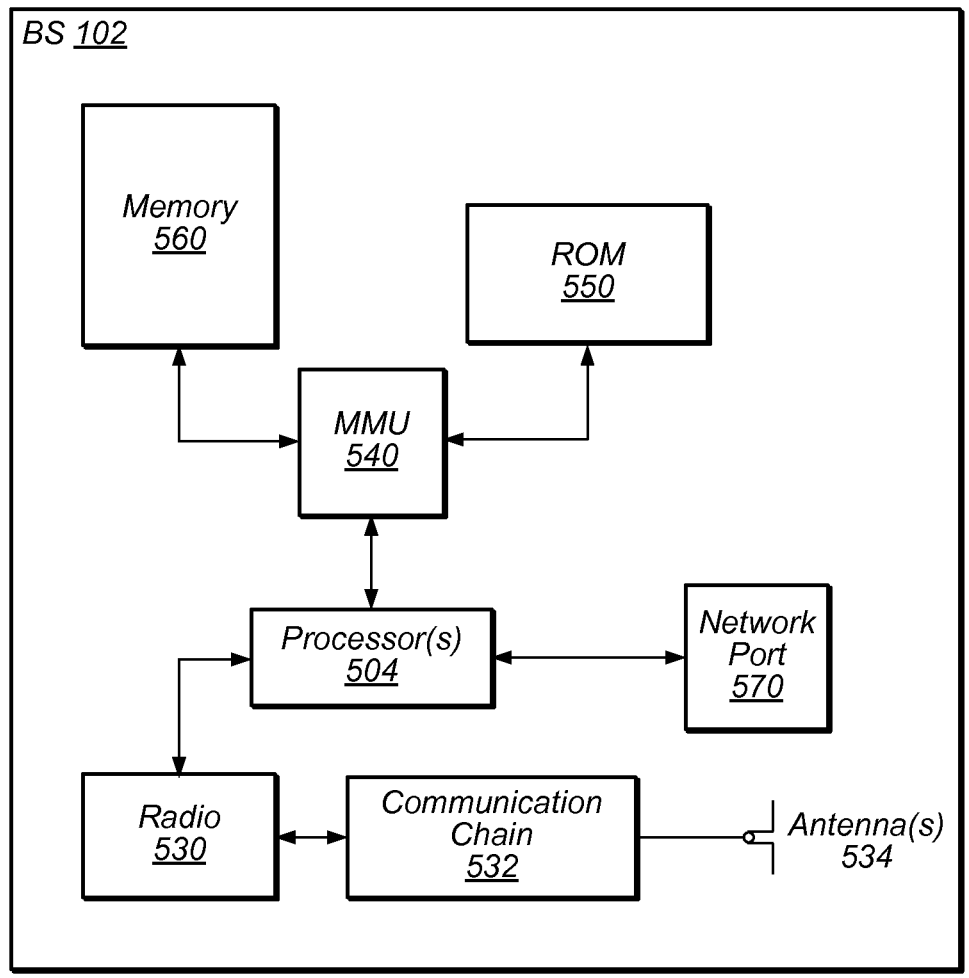
FIG. 5 illustrates an exemplary block diagram of a BS, according to some embodiments.

FIG. 5—Base Station

FIG. 5 illustrates an exemplary block diagram of a base station 102. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534. The antenna(s) 534 may be configured to operate as a wireless transceiver and may be further configured to communicate with UE devices 106 via radio 530. The antenna(s) 534 communicates with the radio 530 via communication chain 532. Communication chain 532 may be a receive chain, a transmit chain or both. The radio 530 may be configured to communicate via various wireless communication technologies, including, but not limited to, LTE, LTE-A, GSM, WCDMA, CDMA2000, Wi-Fi, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
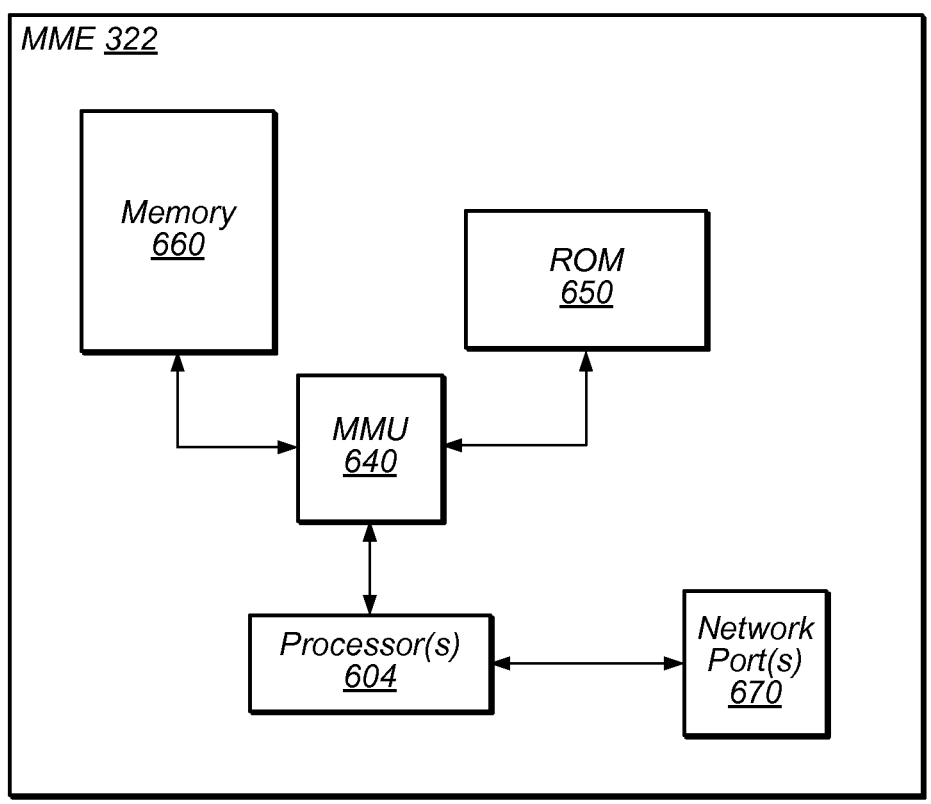
FIG. 6 illustrates an exemplary block diagram of an MME, according to some embodiments.

FIG. 6—Mobility Management Entity

FIG. 6 illustrates an exemplary block diagram of a mobility management entity (MME) 322. It is noted that the MME 322 of FIG. 6 is merely one example of a possible MME 322. As shown, the MME 322 may include processor(s) 604 which may execute program instructions for the MME 322. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The MME 322 may include at least one network port 670. The network port 670 may be configured to couple to one or more base stations and/or other cellular core network entities and/or devices.

The MME 322 may provide mobility related services to a plurality of devices, such as UE devices 106. For example, the MME 322 may be responsible for registering UE devices which attempt to perform an attach procedure, a tracking area update procedure, and/or any of various other procedures.

The MME 322 may communicate with base stations (e.g., eNBs) and/or other core network entities/devices by means of any of various communication protocols and/or interfaces. As one example, in a 3GPP context, the MME 322 may use any of an S1-MME, S3, S10, S11, S6a, and/or any of various other communication protocols or interfaces to communicate with other cellular network components.

The processor(s) 604 of the MME 322 may be configured to implement part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
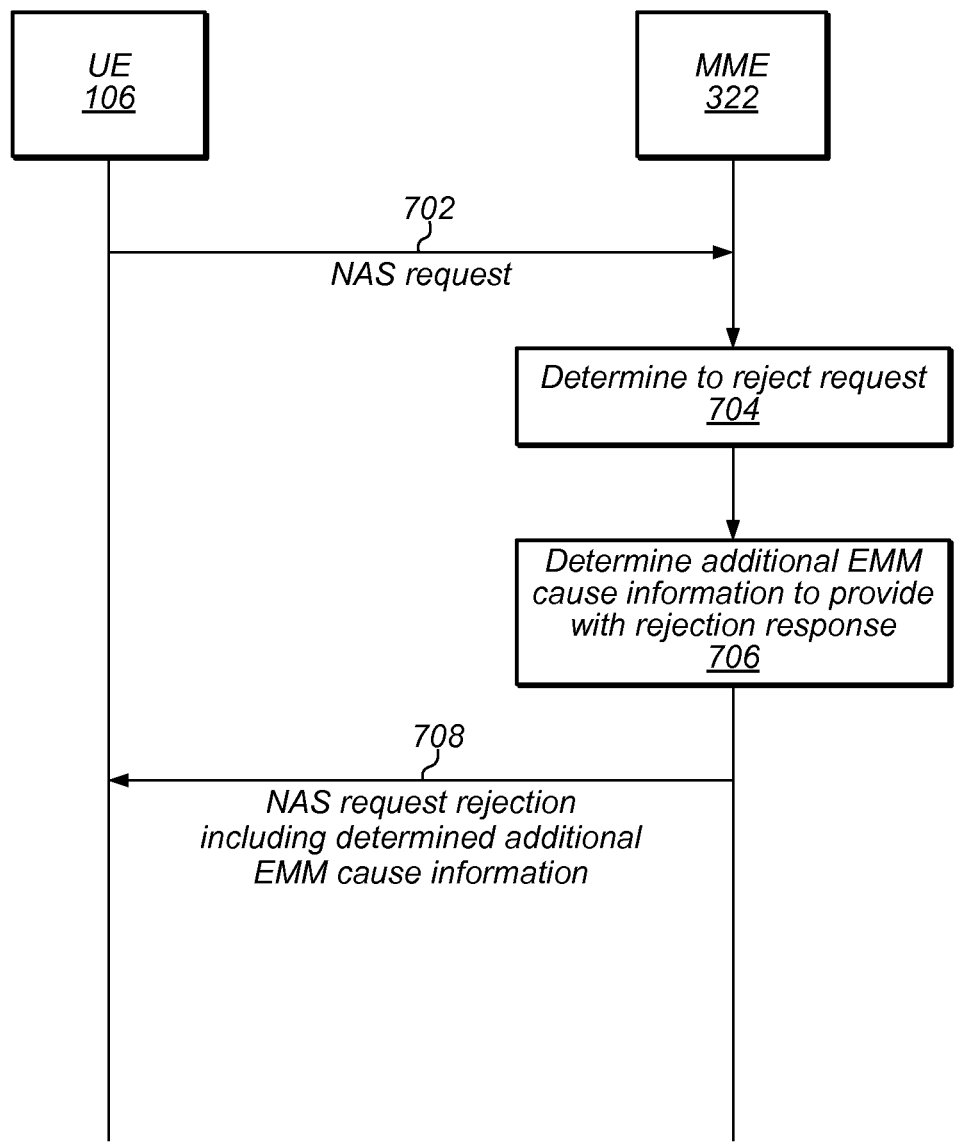
FIG. 7 is a communication flow diagram illustrating an exemplary method for reducing the frequency and/or severity of no-service delays experienced by LTE capable wireless devices which do not have LTE access permission, according to some embodiments.

FIG. 7—Communication Flow Diagram

FIG. 7 is a communication/signal flow diagram illustrating a scheme for responding to NAS requests in a manner that reduces no-service delays for LTE-capable UEs which do not have permission to access LTE networks to which they are attempting to attach. The scheme shown in FIG. 7 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 702, a UE 106 may provide a NAS request to a MME 322. The NAS request may be any of a variety of types of NAS request, such as an attach request, a combined attach request, a tracking area update (TAU) request, or a combined TAU request. The NAS request may generally be a request to obtain evolved universal terrestrial radio access (E-UTRA)) to a public land mobile network (PLMN) with which the MME 322 is associated (e.g., by way of an LTE base station/eNode B/eNB).

In 704, the MME 322 may determine to reject the request. The determination may be based identification and/or authentication information for the UE 106, which the MME 322 may obtain from a home subscriber server (HSS) of the UE 106 and/or one or more other cellular core network entities. For example, the identification and/or authentication information may indicate that the UE does not have permission for E-UTRA/LTE access to the PLMN of the MME 322, at least in the current tracking area of the UE. Such a scenario might occur if the UE 106 is roaming on a PLMN with which its service provider has not negotiated for LTE roaming. As another possibility, such a scenario might occur if the service provider of the UE 106 offers LTE service as a premium service, and the subscription of the LTE-capable UE 106 does not include that premium service. In contrast, if the UE 106 did have permission (e.g., by subscription or roaming agreement between service providers/network operators) to access the E-UTRA/LTE services of the PLMN of the MME 322, the MME 322 might accept the request.

Note that the MME and the HSS may belong to different core networks (e.g., in a roaming scenario in which the UE 106 is attempting to access a PLMN with which its home PLMN has a roaming agreement) or the same core network (e.g., in a non-roaming scenario).

In some instances, the MME 322 may more specifically determine a cause code to provide in conjunction with rejecting the request. For example, if the UE does not have permission for E-UTRA/LTE access to the PLMN of the MME 322, at least in the current tracking area of the UE, the MME 322 may determine to provide Evolved Packet Service (EPS) mobility management (EMM) cause #15 "no suitable cells in tracking area".

In 706, the MME 322 may determine additional EMM cause information to provide with a rejection response. The additional EMM cause information may include an extended EMM cause information element which may relate to whether or not the UE is permitted LTE access to the PLMN in areas other than the current tracking area. For example, the additional EMM cause information may include an indication to the UE 106 that E-UTRA/LTE access to the current TA of the PLMN of the MME 322 is forbidden to the UE, or that E-UTRA/LTE access to the multiple TAs of the PLMN of the MME 322 (e.g., including the current TA) is forbidden to the UE, or that E-UTRA/LTE access to the PLMN of the MME 322 is generally forbidden and UE shall disable LTE capabilities and ignore LTE cells of the PLMN of the MME 322.

In some instances, if the additional EMM cause information includes an indication that E-UTRA/LTE access to multiple TAs of the PLMN of the MME 322 is forbidden to the UE, further information may be provided specifying which TAs are forbidden to the UE 106. For example, a list of forbidden TA identifiers (TAIs) corresponding to the forbidden TAs may be provided in such a case.

The MME 322 may determine to provide different additional EMM cause information in different scenarios. For example, as one possible scenario, LTE access to the home PLMN of the UE 106 might be allowed, and GSM/UMTS roaming access to another ("roaming") PLMN (which may overlap with the home PLMN of the UE 106) may be allowed to the UE 106, but LTE roaming access to the roaming PLMN may not be allowed to the UE 106, for example as a result of specific roaming agreements between network operators of the respective PLMNs. In such a case, the home PLMN and roaming PLMN may be treated as equivalent PLMNs (EPLMNs) by the UE 106. In such a case, if the UE 106 attempts E-UTRA attachment to the roaming PLMN, the MME 322 (i.e., in this case the MME of the roaming PLMN) may reject the attempt. If the MME 322 were to indicate to disable LTE in the rejection, even though LTE access to the roaming PLMN is indeed not allowed to the UE 106, this would also prevent the UE 106 from moving to an LTE cell of its home PLMN (i.e., as an EPLMN of the roaming PLMN). Accordingly, in such a scenario, the MME 322 may determine to provide a list of TAs of the PLMN of the MME 322 which are forbidden to the UE 106. This may at least prevent the UE 106 from attempting to E-UTRA/LTE access to the roaming PLMN upon entering a new TA which is on the list of forbidden TAs, without preventing the UE 106 from accessing LTE cells of its home PLMN to which it is permitted access.

As another possible scenario, although the UE 106 may be capable of LTE communication, its subscription may not include LTE access. In such a case, providing an indication to the UE 106 that E-UTRA/LTE access to the PLMN of the MME 322 is generally forbidden or to disable LTE and ignore LTE cells of the PLMN of the MME 322 may prevent the UE 106 from attempting to move back to LTE. Furthermore, disabling LTE may result in the UE 106 not unnecessarily performing cell re-selection measurements on LTE cells to which it does not have permission to access, which may improve battery life.

In 708, the MME 322 may send to the UE 106 a rejection response to the NAS response, which may include the determined additional EMM cause information.

The rejection response may have any of a variety of formats, and may include any of a variety of information in addition to the determined additional EMM cause information. As one possibility, the additional EMM cause information may be included in an additional EMM cause information element (IE), which may include an additional EMM cause field. Various values may be specified as having specific meanings when included in the an additional EMM cause field of the additional EMM cause IE. For example, a first value might be defined as specifying that E-UTRA/LTE access to the current TA of the PLMN of the MME 322 is forbidden to the UE, while a second value might be defined as specifying that E-UTRA/LTE access to multiple TAs of the PLMN of the MME 322 is forbidden to the UE, and a third value might be defined as specifying that E-UTRA/LTE access to the PLMN of the MME 322 is generally forbidden and UE shall disable LTE capabilities and ignore LTE cells of the PLMN of the MME 322.

The rejection response may include a further information element, such as a forbidden TAI list IE, if desired, which may include a list of TAIs of those TAs to which E-UTRA/LTE access is forbidden to the UE 106, e.g., if the additional EMM cause field is set to the second value.

At least in some instances, the UE 106 may modify its operation based on the NAS request rejection and the associated cause information. For example, if extended cause information indicates that LTE access to the PLMN of the MME 322 is generally forbidden, the UE 106 may disable its LTE capabilities and ignore LTE cells of the PLMN. The UE 106 may in this case search for a suitable cell in another location area in response to the indication.

As another example, the UE 106 might store TAIs for those TAs to which E-UTRA/LTE access is forbidden to the UE 106. This may enable the UE 106 to determine if it has moved to such a TA, and potentially to refrain from sending a NAS request and attempting to attach to the PLMN's LTE network in that tracking area on that basis.

Note additionally that, at least in some instances, a home network operator may be able to configure how the UE 106 responds to certain types of extended cause information for NAS request rejections. For example, the UE 106 might be configured by the home network operator such that a "E-UTRA Disabling Allowed for EMM cause #15" parameter is either enabled or disabled; in such a case, if such a parameter is enabled, the UE 106 may act on the extended cause IE "E-UTRAN not allowed" for EMM cause #15 and disable LTE capability of the UE 106, while if such a parameter is disabled, the UE 106 may disregard the extended cause IE "E-UTRAN not allowed" for EMM cause #15 and leave its LTE capability enabled.

Thus, according to the scheme of FIG. 7, a MME 322 may provide additional cause information when rejecting a NAS LTE attach or TAU request, which may reduce the frequency at which no-service delays occur at a UE 106 as a result of such an attempt to obtain LTE access to an LTE network (or a TA of an LTE network) which the UE 106 does not have permission to access.

FIGS. 8-11—Exemplary Cellular Network Architecture Diagrams, Attach Procedure and Tracking Area Update Procedure Signal Flow Diagrams FIGS. 8-11 and the following supplementary description are provided as being illustrative of further considerations and possible implementation details, and are not intended to be limiting to the disclosure as a whole. Numerous variations and alternatives to the details provided herein below are possible and should be considered within the scope of the disclosure.

Figure 8:
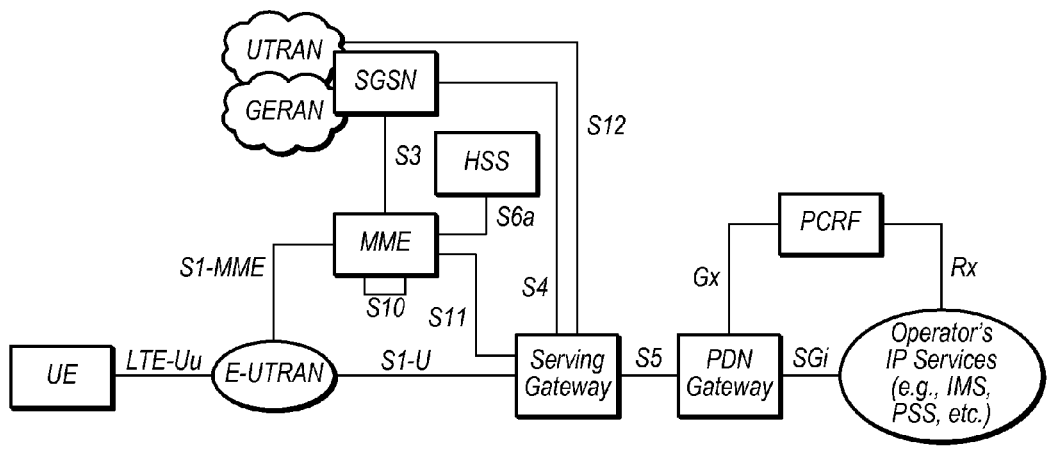
FIGS. 8-9 illustrate further exemplary cellular network architectures, according to some embodiments.
Figure 9:
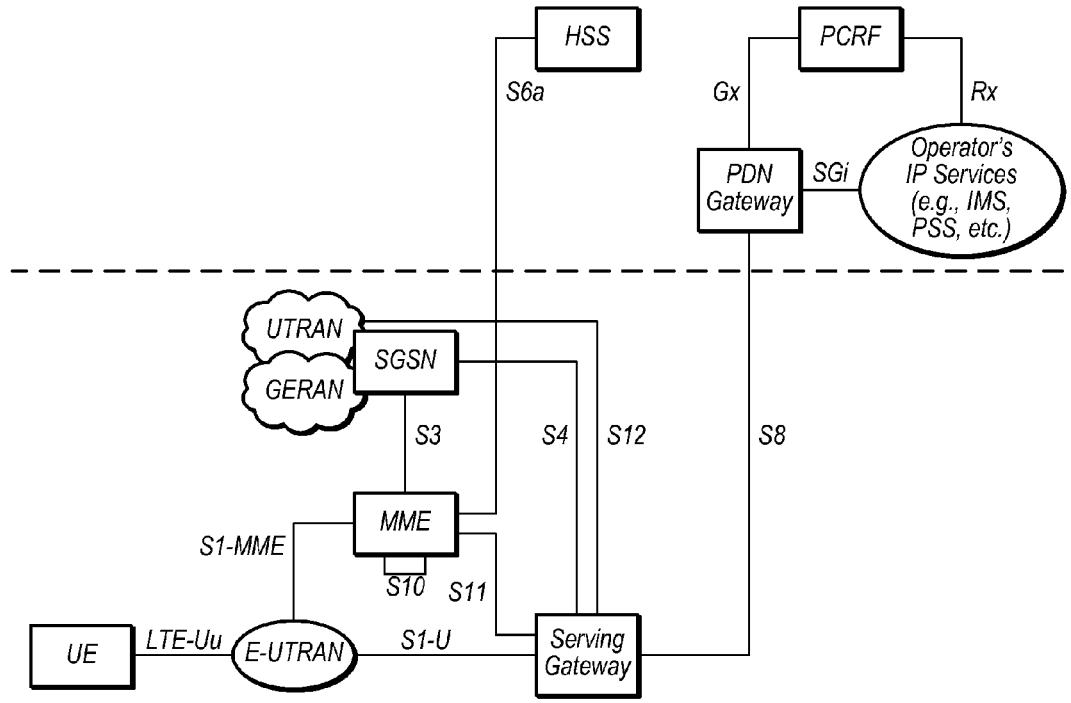

FIGS. 8-9 illustrate exemplary LTE cellular network architecture diagrams, representing non-roaming and roaming scenarios respectively. As shown, a UE may communicate with the LTE cellular network by way of the evolved universal terrestrial radio access network (E-UTRAN). The cellular network may include mobility management entity(s) (MME(s)), serving GPRS support node(s), home subscriber server(s) (HSS(s)), serving gateway(s), packet data network (PDN) gateway(s), policy and charging rules function(s) (PCRF(s)), and/or IP services (e.g., IP multimedia subsystem (IMS), packet switch streaming (PSS), etc.). The cellular network may also provide access to one or more legacy 3GPP cellular networks (e.g., UMTS terrestrial radio access network (UTRAN) and/or GSM EDGE radio access network (GERAN)).

Figure 10:
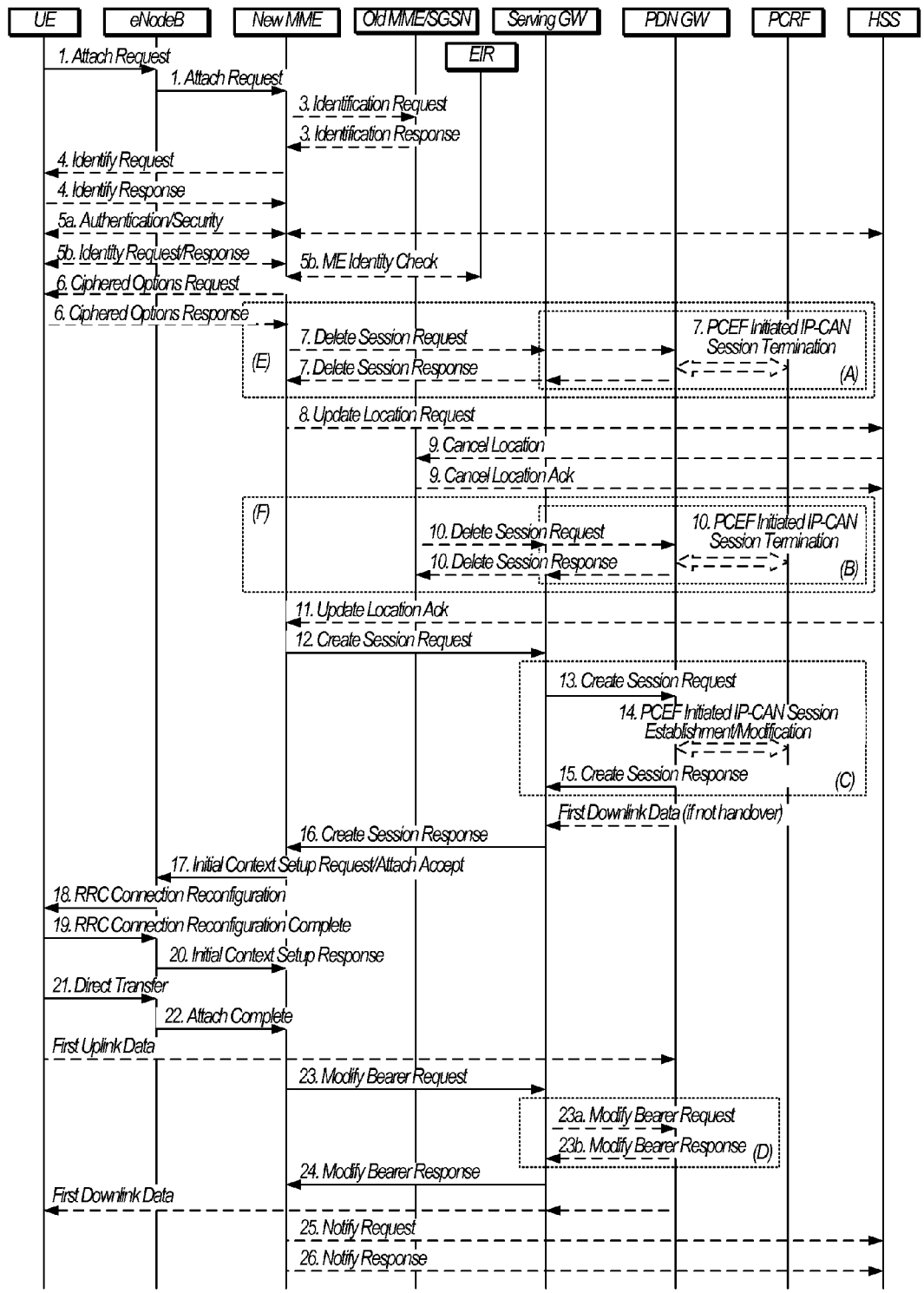
FIG. 10 is a signal flow diagram illustrating an exemplary Attach procedure, according to some embodiments.
Figures 11, 12:
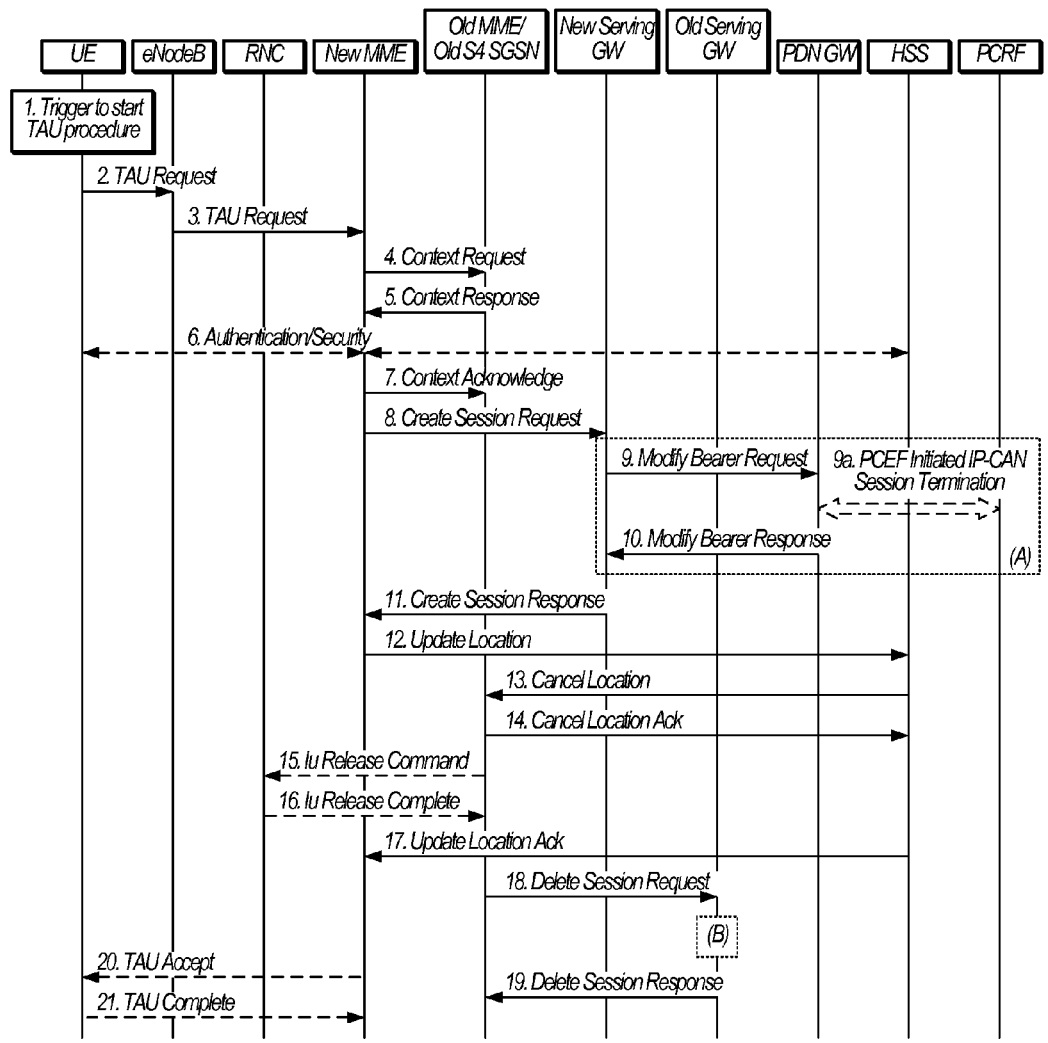
FIG. 11 is a signal flow diagram illustrating an exemplary TAU procedure, according to some embodiments.
FIG. 12 illustrates an exemplary additional EMM cause information element, according to some embodiments.

FIGS. 10-11 illustrate exemplary signal flows which may be used in conjunction with E-UTRA attach procedures and tracking area update (TAU) procedures respectively. As shown, such procedures may initiate with a UE submitting an attach or TAU request to an MME by way of an eNodeB. The MME may determine whether or not to accept the request, including obtaining various identification and authentication information from one or more other network elements (such as the HSS) and/or the UE itself. If the request is to be accepted, the MME may perform various registration functions (again possibly in conjunction with other network entities) and indicate (again by way of an eNodeB) to the UE that the request is accepted. Otherwise, a rejection message, possibly indicating cause information (such as according to the method of FIG. 7), may be provided to the UE.

Additional Description

The following additional information is provided as being illustrative of further considerations and possible implementation details, and are not intended to be limiting to the disclosure as a whole. Numerous variations and alternatives to the details provided herein below are possible and should be considered within the scope of the disclosure.

In order to provide a range of possible services or for any of various other reasons, cellular service providers may provide subscription options and/or negotiate roaming agreements which limit or do not include permission to access all possible network elements with which a wireless device is technically capable of accessing. In at least some scenarios, this may result in service delays, periods of no service, or other problems at times when such a device attempts to access, and is rejected by, a type of service which it is not permitted to access.

For example, in one possible scenario, a roaming user might have a GSM/UMTS roaming agreement with a roaming operator but no LTE roaming agreement. The UE in such a case might try to register in the roaming operator's LTE network, and be rejected. As another exemplary scenario, an operator may treat LTE as a preferential service only available for customers on a premium subscription basis. The user may utilize an LTE-capable UE, but not obtain the premium (LTE) subscription. The UE may try to register in the home operator's LTE network and be rejected in such a scenario.

In both exemplary scenarios, the users may experience excessive periodic no-service delays in registration (e.g., 15-20 seconds, or other delay lengths) until the UE registers on the GSM or UMTS network of the same PLMN. Such a no-service delay may happen periodically (e.g., every 12 to 24 hours) even when stationary, and possibly also when the user moves and enters a new TA.

Network operators may use a NAS reject message with EMM cause #15 to handle both exemplary scenarios. In particular, according to TS 24.301, if the attach request or the tracking area updating request cannot be accepted by the network, the MME shall send an ATTACH REJECT or TRACKING AREA UPDATE REJECT message to the UE including an appropriate EMM cause value. EMM cause value #15 means "No suitable cells in tracking area". In case of such a response, a UE may set the EPS update status to EU3 ROAMING NOT ALLOWED and enter the state EMM-REGISTERED.LIMITED-SERVICE. Additionally, the UE shall store the current Tracking Area Identity (TAI) in the list of "forbidden tracking areas for roaming" and remove the current TAI from the stored TAI list if present.

Thus, the EMM cause value #15 as currently specified causes only the TA on which the cause value was received to be added to the list of "forbidden tracking areas for roaming". Accordingly, when the UE moves and enters a new TA, the UE may attempt a new registration to the new TA in the same PLMN and the UE may again be rejected. This problem may be repeated every time the UE enters a new TA. Hence, the user experiences no service for a period of time while the UE attempts an unsuccessful registration and performs cell selection that returns the UE to the GSM or UMTS network of the same PLMN. This may result in a poor user experience and unnecessary battery drain. As a further undesirable result, the network may process unnecessary signaling messages.

Furthermore, the UE is required to delete the list of forbidden TAIs for roaming every 12 to 24 hours. Hence, the unnecessary registration/update attempts may be repeated periodically even if the UE is stationary.

As a possible solution, EMM cause code #15 may be extended with a new information element that can include additional TAIs that are considered as forbidden for roaming. As one possibility, the tracking area identity list as specified in TS 24.301 clause 9.9.3.33 (which may support inclusion of 16 different TAIs) may be used to convey the additional forbidden tracking areas for roaming. It may be left to each network operator to decide how many additional TAIs to include in the reject message, e.g., in order to provides satisfactory geographical coverage for a typical roaming user. As one possibility, the UE may be able to maintain a list of up to 40 forbidden TAIs at one time.

Alternatively, or in addition, the reject message could optionally include an indicator together with EMM cause code #15 that instructs the UE to disable LTE capabilities upon receiving the additional EMM cause code #15. In some instances, this indicator may only be distributed to international roaming users and users accessing their home network with an LTE-capable UE but without LTE subscription, for example since it may be assumed to be acceptable to disable LTE capabilities for these use cases at least in some instances. The UE may be required to re-enable LTE capabilities for its next PLMN selection (e.g., as specified in TS 23.122), at least in some instances.

Note that for 'national roaming' users making use of the cell re-selection capability from an EPLMN, it may in some instances be preferable for the reject message to not include the indicator to disable LTE capabilities, though it may still be possible to do so in such instances. For example, disabling LTE capabilities may prevent the UE from moving to an LTE cell of an EPLMN via cell re-selection in such a scenario.

For example, consider the following scenario. Operator A operates a GSM, a UMTS and an LTE network. Operator B is a new entrant operator with an LTE network only, and has a national roaming agreement with Operator A in order provide GSM and UMTS coverage. When a subscriber of Operator B is registered in Operator A's network, the UE may treat Operator B as an EPLMN so that the UE is able to perform cell re-selection to cells of either Operator A or Operator B. Operator A does not want to allow roaming users from Operator B to access its LTE cells. If the UE selects to an LTE cell of Operator A then it will be rejected including EMM cause code #15. If the rejection includes an indication to disable LTE capabilities, and LTE is disabled, the UE will select to a GSM or UMTS cell of Operator A, however it will not be able to access LTE cells of Operator B until LTE capabilities are re-enabled. Hence, the UE could end up stuck on Operator A's GSM or UMTS network and unable to return to Operator B's network.

For reference, contrast the above-described solution of providing an EMM cause code #15 with a new information element that can include additional TAIs that are considered as forbidden for roaming with an alternate solution in which a new indicator is included in an attach reject or TAU reject message which simply indicates that all TAIs of a PLMN belong to forbidden tracking areas. Such an alternate solution may have an impact on access stratum (AS) implementation in a UE.

In particular, the UE's AS layer may currently expect an actual list of "forbidden tracking areas for roaming" from the NAS layer. It may not be possible for the AS layer to translate a simple indication from the NAS layer that all TAs of the PLMN are forbidden to an actual forbidden TAI list, since the AS layer at the UE may be unaware of all the TAIs of the PLMN; furthermore, at least in some implementations, the UE may only be able to maintain a list of up to 40 forbidden TAIs at one time, so even if such translation were implemented, it might not be feasible due to restrictions on the number of forbidden TAIs which can be maintained by the UE.

Thus, the above-described solution of providing an EMM cause code #15 with a new information element that can include additional TAIs that are considered as forbidden for roaming and/or an indication to disable LTE may provide a solution to reduce no-service delays experienced by LTE capable UEs attempting to access forbidden LTE networks. This may be achieved at least in part by providing networks with multiple options for providing additional information to/configuring a UE in conjunction with a rejection response, from which a most appropriate option may be selected based on the specific circumstances experienced by the UE in question. Some of the possible benefits of such a solution are summarized/re-stated below:

If LTE is disabled after receiving the additional EMM cause value #15 in the reject message, disabling LTE may guarantee that the UE is not moved back to LTE in a PLMN in which it has no LTE roaming agreement. This may solve the periodic no-service delay.

Furthermore, disabling LTE may ensure the UE does not unnecessarily perform cell re-selection measurements on LTE cells in the PLMN in which it has no LTE roaming agreement. This may result in better battery life.

The optionality to disable LTE may allow for the operator to handle national roaming users appropriately, e.g., such that a UE can obtain LTE service from an EPLMN. The optional nature of the LTE disabling functionality can be ensured, at least in some implementations, by providing the home network operator with the ability to configure the UE's response to receiving an EMM cause code #15 together with an indicator that instructs the UE to disable LTE capabilities. For example, if the UE is configured by the home network operator not to take into account the indicator to disable LTE capabilities, then the UE may still be able to obtain LTE service from an EPLMN, even if the EPLMN rejects the UE's attachment request and includes an indicator that instructs the UE to disable LTE capabilities with the rejection.

If LTE is not disabled after receiving the additional EMM cause value #15 in the reject message, the NAS layer in the UE can translate the received forbidden TAI list to the AS layer, and the number of service interruptions for the scenarios when the UE moves between Tracking Areas may be reduced.

It should be noted that if LTE is not disabled after receiving the additional EMM cause value #15 in the reject message (e.g., in order to maintain the UE's capability to obtain LTE access to an EPLMN in cell re-selection), periodic no-service delays may still occur periodically (e.g., every 12 to 24 hours), when the UE deletes the list of forbidden TAIs, or when the UE enters into a Tracking Area that has not been listed as part of the forbidden tracking areas for roaming included in the reject message. Additionally, the UE may still perform cell re-selection measurements on LTE cells in a PLMN in which it has no LTE roaming agreement.

Exemplary 3GPP Specification Modifications

In order to provide MMEs with the capability to include an EMM cause code #15 with a new information element that can include additional TAIs that are considered as forbidden for roaming and/or an indication to disable LTE capabilities, changes to certain portions of the LTE NAS specification documents may be made. Such changes may take any of a variety of forms, and may be made in any of a variety of portions of the specification documents. The following proposed changes to 3GPP TS 24.301 are provided as being illustrative of one set of exemplary possible specification changes, and are not intended to be limiting to the disclosure as a whole. Numerous variations and alternatives to the details provided herein below are possible and should be considered within the scope of the disclosure.

As a first possible change, 24.301 §4.5 may be updated to include the following information:

If UE that has disabled its E-UTRA capability due to receiving EMM cause value #15 "no suitable cells in tracking area" and the Additional EMM cause IE with value "E-UTRA not allowed" as specified in subclause 5.3.2, re-enables its E-UTRA capability when PLMN selection is performed, then it should memorize the identity of the PLMN(s) where E-UTRA capability was disabled and use that information in subsequent PLMN selections as specified in 3GPP TS 23.122 [6].

As an additional possible change, 24.301 §5.3.2 may be updated to include the following information:

The MME may provide the Additional EMM cause IE in the ATTACH REJECT or the TRACKING AREA UPDATE REJECT messages if the EMM cause value is set to #15 "no suitable cells in tracking area". If the Additional EMM cause IE is included, the UE that supports the Additional EMM cause IE shall follow one of these procedures:

if the Additional EMM cause IE indicates "Current TA forbidden in the selected PLMN, E-UTRA allowed" or "E-UTRA not allowed", the UE shall consider the current tracking area forbidden for roaming. The UE shall update the list of "forbidden tracking areas for roaming" with the current TAI; or if the Additional EMM cause IE indicates "List of TAs forbidden in the selected PLMN, E-UTRA allowed", the UE shall consider the list of tracking areas as provided in the Forbidden TAI list IE forbidden. The UE shall update the list of "forbidden tracking areas for roaming" with the list of TAIs present in the Forbidden TAI list IE;

As an additional possible change, 24.301 §5.5.1.2.5 may be updated to include the following information:

15 (No suitable cells in tracking area);

The UE shall set the EPS update status to EU3 ROAMING NOT ALLOWED (and shall store it according to subclause 5.1.3.3) and shall delete any GUTI, last visited registered TAI and eKSI. Additionally, the UE shall reset the attach attempt counter.

In S1 mode:

the UE shall update the list of "forbidden tracking areas for roaming" as specified in subclause 5.3.2 and enter the state EMM-DEREGISTERED.LIMITED-SERVICE;

if the Additional EMM cause IE is not included in the ATTACH REJECT message or if this IE is included with any other value than "E-UTRA not allowed", then the UE shall search for a suitable cell in another tracking area or in another location area according to 3GPP TS 36.304 [21]; and if the Additional EMM cause IE with value "E-UTRA not allowed" is included in the ATTACH REJECT message, then the UE shall disable the E-UTRA capability as specified in subclause 4.5 and search for a suitable cell in another location area in the same PLMN according to 3GPP TS 36.304 [21].

NOTE: The use and correct setting of the Additional EMM cause IE in a network is an operator option. If this IE is set to "E-UTRA not allowed", the ability of the UE to reselect to an E-UTRA cell of an equivalent PLMN will be impacted.

As an additional possible change, 24.301 §5.5.1.3.5 may be updated to include the following information:

15 (No suitable cells in tracking area);

The UE shall set the EPS update status to EU3 ROAMING NOT ALLOWED (and shall store it according to subclause 5.1.3.3) and shall delete any GUTI, last visited registered TAI and eKSI. Additionally the UE shall reset the attach attempt counter and enter the state EMM-DEREGISTERED.LIMITED-SERVICE.

The UE shall update the list of "forbidden tracking areas for roaming" as specified in subclause 5.3.2.

If the Additional EMM cause IE is not included in the ATTACH REJECT message or if this IE is included with any other value than "E-UTRA not allowed", then the UE shall search for a suitable cell in another tracking area or in another location area according to 3GPP TS 36.304 [21].

If the Additional EMM cause IE with value "E-UTRA not allowed" is included in the ATTACH REJECT message, then the UE shall disable the E-UTRA capability as specified in subclause 4.5 and search for a suitable cell in another location area in the same PLMN according to 3GPP TS 36.304 [21].

NOTE: The use and correct setting of the Additional EMM cause IE in a network is an operator option. If this IE is set to "E-UTRA not allowed", the ability of the UE to reselect to an E-UTRA cell of an equivalent PLMN will be impacted.

As an additional possible change, 24.301 §5.5.3.2.5 may be updated to include the following information:

15 (No suitable cells in tracking area);

The UE shall set the EPS update status to EU3 ROAMING NOT ALLOWED (and shall store it according to subclause 5.1.3.3). The UE shall reset the tracking area updating attempt counter and shall enter the state EMM-REGISTERED.LIMITED-SERVICE.

The UE shall update the list of "forbidden tracking areas for roaming" as specified in subclause 5.3.2 and shall remove the current TAI from the stored TAI list if present.

If the Additional EMM cause IE is not included in the TRACKING AREA UPDATE REJECT message or if this IE is included with any other value than "E-UTRA not allowed", then the UE shall search for a suitable cell in another tracking area or in another location area according to 3GPP TS 36.304 [21].

If the Additional EMM cause IE with value "E-UTRA not allowed" is included in the TRACKING AREA UPDATE REJECT message, then the UE shall disable the E-UTRA capability as specified in subclause 4.5 and search for a suitable cell in another location area in the same PLMN according to 3GPP TS 36.304 [21].

NOTE: The use and correct setting of the Additional EMM cause IE in a network is an operator option. If this IE is set to "E-UTRA not allowed", the ability of the UE to reselect to an E-UTRA cell of an equivalent PLMN will be impacted.

As an additional possible change, 24.301 §5.5.3.3.5 may be updated to include the following information:

15 (No suitable cells in tracking area);

The UE shall set the EPS update status to EU3 ROAMING NOT ALLOWED (and shall store it according to subclause 5.1.3.3). The UE shall reset the tracking area updating attempt counter and shall enter the state EMM-REGISTERED.LIMITED-SERVICE.

The UE shall update the list of "forbidden tracking areas for roaming" as specified in subclause 5.3.2 and shall remove the current TAI from the stored TAI list if present.

If the Additional EMM cause IE is not included in the TRACKING AREA UPDATE REJECT message or if this IE is included with any other value than "E-UTRA allowed", then the UE shall search for a suitable cell in another tracking area or in another location area according to 3GPP TS 36.304 [21].

If the Additional EMM cause IE with value "E-UTRA not allowed" is included in the TRACKING AREA UPDATE REJECT message, then the UE shall disable the E-UTRA capability as specified in subclause 4.5 and search for a suitable cell in another location area in the same PLMN according to 3GPP TS 36.304 [21].

NOTE: The use and correct setting of the Additional EMM cause IE in a network is an operator option. If this IE is set to "E-UTRA not allowed", the ability of the UE to reselect to an E-UTRA cell of an equivalent PLMN will be impacted.

As an additional possible change, 24.301 §8.2.3.1 may be updated to include the following information:

TABLE 1

ATTACH REJECT message content

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Attach reject message identity | Message type 9.8 | M | V | 1 |
| | EMM cause | EMM cause 9.9.3.9 | M | V | 1 |

TABLE 1-continued

ATTACH REJECT message content

| IEI | Information Element | Type/Reference | Presence | Format | Length |
|---|---|---|---|---|---|
| 78 | ESM message container | ESM message container 9.9.3.15 | O | TLV-E | 6-n |
| 5F | T3346 value | GPRS timer 2 9.9.3.16A | O | TLV | 3 |
| 16 | T3402 value | GPRS timer 2 9.9.3.16A | O | TLV | 3 |
| A- | Additional EMM cause | Additional EMM cause 9.9.3.x | O | TV | 1 |
| 54 | Forbidden TAI list | Tracking area identity list 9.9.3.33 | O | TLV | 8-98 |

As an additional possible change, additional subheadings under 24.301 §8.2.3 (e.g., 8.2.3.x and 8.2.3.y, where 'x' and 'y' represent as-yet-undetermined integer numbers) may be created and may include the following information:

8.2.3.x Additional EMM Cause

The MME may include this IE to indicate additional information associated with the EMM cause.

8.2.3.y Forbidden TAI List

If the message includes the Additional EMM cause IE with the value of "List of TAs forbidden in the selected PLMN, E-UTRA allowed", the MME shall include this IE to indicate a list of forbidden tracking areas for roaming.

As an additional possible change, 24.301 §8.2.28.1 may be updated to include the following information:

TABLE 2

| IEI | Information Element | Type/Reference | Presence | Format | Length |
|---|---|---|---|---|---|
|  | Protocol discriminator | Protocol discriminator 9.2 | M | V | 1/2 |
|  | Security header type | Security header type 9.3.1 | M | V | 1/2 |
|  | Tracking area update reject message identity | Message type 9.8 | M | V | 1 |
|  | EMM cause | EMM cause 9.9.3.9 | M | V | 1 |
| 5F | T3346 value | GPRS timer 2 9.9.3.16A | O | TLV | 3 |
| A- | Additional EMM cause | Additional EMM cause 9.9.3.x | O | TV | 1 |
| 54 | Forbidden TAI list | Tracking area identity list 9.9.3.33 | O | TLV | 8-98 |

As an additional possible change, additional subheadings under 24.301 §8.2.28 (e.g., 8.2.28.x and 8.2.28.y, where 'x' and 'y' represent as-yet-undetermined integer numbers) may be created and may include the following information:

8.2.28.x Additional EMM Cause

The MME may include this IE to indicate additional information associated with the EMM cause.

8.2.28.y Forbidden TAI List

If the message includes the Additional EMM cause IE with the value of "List of TAs forbidden in the selected PLMN, E-UTRA allowed", the MME shall include this IE to indicate a list of forbidden tracking areas for roaming.

As an additional possible change, an additional subheading under 24.301 §9.9.3 (e.g., 9.9.3.x, where 'x' represents an as-yet-undetermined integer number) may be created and may include the following information:

9.9.3.x Additional EMM Cause

The purpose of the Additional EMM cause information element is to specify additional information associated with the EMM cause.

The Additional EMM cause information element is coded as shown in FIG. 12 and Table 3.

TABLE 3

Additional EMM cause information element
Additional EMM cause (octet 1)

| Bits | | |
|---|---|---|
| 2 | 1 | |
| 0 | 0 | Current TA forbidden in the selected PLMN, E-UTRA allowed |
| 0 | 1 | List of TAs forbidden in the selected PLMN, E-UTRA allowed |

TABLE 3-continued

Additional EMM cause information element
Additional EMM cause (octet 1)

| Bits | | |
|---|---|---|
| 2 | 1 | |
| 1 | 0 | E-UTRAN not allowed |
| 1 | 1 | reserved |

Bits 3 and 4 of octet 1 are spare and shall be coded as zero.

In the following further exemplary embodiments of the disclosure are presented.

As a first example, a method may comprise: receiving, at a mobility management entity (MME) of a first public land mobile network (PLMN), an LTE attach request, combined attach request, tracking area update request, or combined tracking area request from a wireless user equipment (UE) device by way of a cellular base station (BS); obtaining identification and/or authentication information for the UE;

determining, based on the identification and/or authentication information, to reject the request; sending a rejection response to the request, wherein the rejection response comprises information comprising one or more of: an indication of a plurality of forbidden LTE tracking areas (TAs) of the first PLMN; or an indication that LTE access to the first PLMN is forbidden to the UE.

A further example may include the method described above, wherein obtaining the identification and/or authentication information for the UE comprises consulting a home subscriber server (HSS) for the UE, wherein determining to reject the request comprises determining that the UE does not have evolved universal terrestrial radio access (E-UTRA) permission to the PLMN.

A still further example may include a method according to any of the above examples, wherein the rejection response comprises an additional EMM cause information element comprising an additional EMM cause field, of which: a first value is defined as specifying that evolved universal terrestrial radio access (E-UTRA) to a current TA of the first PLMN is forbidden to the UE, but E-UTRA is not generally forbidden to the UE, a second value is defined as specifying that E-UTRA to a plurality of TAs of the first PLMN is forbidden to the UE, but E-UTRA is not generally forbidden to the UE, and a third value is defined as specifying that E-UTRA is generally forbidden to the UE.

Yet another example may include the method described just above, wherein if the additional EMM cause field is set to the second value, the rejection response further comprises a forbidden TA identifier (TAI) list information element comprising a list of TAIs of the plurality of TAs of the first PLMN to which E-UTRA is forbidden to the UE Another set of exemplary embodiments may include a mobility management entity (MME), comprising: one or more network ports configured to communicate with one or more cellular network elements and/or other devices; and an processing element operably coupled to the one or more network ports; wherein the MME is configured to implement any of the example methods described above.

As another example, a method for operating a wireless user equipment (UE) device may comprise: sending, to a mobility management entity (MME) of a first public land mobile network (PLMN), an LTE attach request, combined attach request, tracking area update request, or combined tracking area request by way of a cellular base station (BS); receiving a rejection response to the request, wherein the rejection response comprises information comprising one or more of: an indication of a plurality of forbidden LTE tracking areas (TAs) of the first PLMN; or an indication that LTE access to the first PLMN is forbidden to the UE.

A further example may include the above-described exemplary method, wherein the rejection response comprises an additional EMM cause information element comprising an additional EMM cause field, of which: a first value is defined as specifying that evolved universal terrestrial radio access (E-UTRA) to a current TA of the first PLMN is forbidden to the UE, but E-UTRA is not generally forbidden to the UE, a second value is defined as specifying that E-UTRA to a plurality of TAs of the first PLMN is forbidden to the UE, but E-UTRA is not generally forbidden to the UE, and a third value is defined as specifying that E-UTRA is generally forbidden to the UE.

A still further example may include the above-described exemplary method, wherein if the additional EMM cause field is set to the second value, the rejection response further comprises a forbidden TA identifier (TAI) list information element comprising a list of TAIs of the plurality of TAs of the first PLMN to which E-UTRA is forbidden to the UE.

Yet another example may include a wireless user equipment (UE) device, comprising: one or more radios, coupled to one or more antennas configured for wireless communication; and an processing element operably coupled to the one or more radios; wherein the UE is configured to implement any of the methods of the preceding examples.

Still another example may include a non-transitory computer accessible memory medium comprising program instructions which, when executed at a device, cause the device to implement any of the methods of the preceding examples.

An additional example may include a computer program comprising instructions for performing any of the methods of the preceding examples.

A further additional example may include an apparatus comprising means for performing any of the method elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A method, comprising:
by a mobility management entity (MME) of a first public land mobile network (PLMN):
receiving an E-UTRAN (Evolved Universal Terrestrial Access Network) non-access stratum (NAS) request from a wireless user equipment (UE) device;
determining to reject the request;
sending a rejection response to the request, wherein the rejection response comprises an evolved packet service mobility management (EMM) cause #15 specifying "no suitable cells in tracking area", wherein the rejection response further comprises an extended

EMM cause information element (IE) with a value "E-UTRAN not allowed".

2. The method of claim 1, wherein the NAS request comprises one of:
an attach request;
a combined attach request;
a tracking area update request; or
a combined tracking area request.

3. The method of claim 1, wherein the method further comprises:
obtaining identification and authentication information for the UE;
determining to reject the request based on the identification and authentication information for the UE.

4. The method of claim 1,
wherein the extended EMM cause IE with the value "E-UTRAN not allowed" indicates to the UE that E-UTRAN access to the first PLMN is forbidden to the UE.

5. A mobility management entity (MME) of a first public land mobile network (PLMN), comprising:
one or more network ports; and
an processing element operably coupled to the one or more network ports;
wherein the processing element and the one or more network ports are configured to:
receive a request for access to the first PLMN according to a first radio access technology (RAT) in a first area from a wireless user equipment (UE) device by way of a cellular base station (BS);
obtain identification and/or authentication information for the UE;
determine, based on the identification and/or authentication information, that access to the first PLMN in the area according to the first RAT is not available to the UE in response to the request; and
send a response to the UE rejecting the request based on determining that access to the first PLMN in the area according to the first RAT is not available to the UE,
wherein the response rejecting the request comprises cause information indicating that access to the first PLMN in the area according to the first RAT is not available to the UE,
wherein the rejection response further comprises extended cause information relating to permission to access the first PLMN in other areas according to the first RAT.

6. The MME of claim 5, wherein the extended cause information comprises an indication that access to the first PLMN according to the first RAT is forbidden to the UE in all areas.

7. The MME of claim 5, wherein the extended cause information comprises an indication of a plurality of other areas in which access to the first PLMN according to the first RAT is forbidden to the UE.

8. The MME of claim 5,
wherein obtaining the identification and/or authentication information for the UE comprises consulting a home subscriber server (HSS) for the UE.

9. The MME of claim 5, wherein the extended cause information comprises a field in which:
a first value is defined as specifying that access to the first PLMN in the area according to the first RAT is forbidden to the UE, but access to the first PLMN according to the first RAT is not generally forbidden to the UE,
a second value is defined as specifying that access to the first PLMN according to the first RAT is forbidden to the UE in a plurality of areas, but access to the first PLMN according to the first RAT is not generally forbidden to the UE, and
a third value is defined as specifying that access to the first PLMN according to the first RAT is generally forbidden to the UE.

10. The MME of claim 9, wherein if the extended cause information field is set to the second value, the response rejecting the request further comprises a list of areas in which access to the first PLMN according to the first RAT is forbidden to the UE.

11. The MME of claim 5, wherein the request comprises a long term evolution (LTE) non-access stratum (NAS) request, wherein the LTE NAS request comprises one of:
an attach request;
a combined attach request;
a tracking area update request; or
a combined tracking area request.

12. The MME of claim 5,
wherein the cause information comprises an EMM cause #15 specifying "no suitable cells in tracking area",
wherein the extended cause information comprises an extended EMM cause information element (IE) with a value "E-UTRAN (Evolved Universal Terrestrial Access Network) not allowed".

13. A method for operating a wireless user equipment (UE) device, the method comprising:
sending, to a mobility management entity (MME) of a first public land mobile network (PLMN), a long term evolution (LTE) attach request, combined attach request, tracking area update request, or combined tracking area request by way of a cellular base station (BS);
receiving a rejection response to the request,
wherein the rejection response comprises information comprising an evolved packet service mobility management (EMM) cause #15 specifying "no suitable cells in tracking area",
wherein the rejection response further comprises an extended EMM cause information element (IE).

14. The method of claim 13,
wherein the extended EMM cause information element (IE) indicates that LTE access to the first PLMN is forbidden to the UE.

15. The method of claim 14, wherein the method further comprises:
disabling LTE capability in response to the extended EMM cause information element (IE) indicating that LTE access to the first PLMN is forbidden to the UE.

16. The method of claim 15, wherein the method further comprises:
receiving a configuration parameter from a home PLMN of the UE allowing disabling of LTE capability for EMM cause #15,
wherein said disabling LTE capability is also performed at least in part based on the configuration parameter allowing disabling of LTE capability for EMM cause #15.

17. The method of claim 14, wherein the method further comprises:
searching for a suitable cell in another location area in response to the extended EMM cause information element (IE) indicating that LTE access to the first PLMN is forbidden to the UE.

18. The method of claim 13,
wherein the extended EMM cause information element (IE) indicates that a plurality of LTE tracking areas (TAs) of the first PLMN are forbidden to the UE.

19. The method of claim 18, wherein the method further comprises:
storing tracking area identifiers (TAIs) for the plurality of LTE TAs of the first PLMN which are forbidden to the UE;
determining that the UE has moved to one of the plurality of LTE TAs of the first PLMN which are forbidden to the UE; and
refraining from performing an LTE attach procedure with the first PLMN based on determining that the UE has moved to one of the plurality of LTE TAs of the first PLMN which are forbidden to the UE.

20. The method of claim 13,
wherein the extended EMM cause IE is a type 1 information element having a length of one octet.

\* \* \* \* \*